United States Patent [19]
Keller et al.

[11] Patent Number: 5,671,227
[45] Date of Patent: Sep. 23, 1997

[54] TRANSMISSION SYSTEM FOR TRANSMITTING AND DETECTING THE BEGINNING OF THE FRAME OF A FRAME SYNCHRONIZED SIGNAL

[75] Inventors: Hans-Georg Keller, Nürnberg; Karl Hönig, Postbauer-Heng, both of Germany

[73] Assignee: Lucent Technologies Inc., Murray Hill, N.J.

[21] Appl. No.: 513,316

[22] Filed: Aug. 10, 1995

[30] Foreign Application Priority Data

Aug. 20, 1994 [DE] Germany ............... 44 29 595.2

[51] Int. Cl.$^6$ .................. H04L 7/00; H04J 3/06
[52] U.S. Cl. .............. 370/509; 370/513; 375/368
[58] Field of Search ............... 370/100.1, 105.1, 370/105.4, 106, 503, 506, 508, 509, 510, 512, 513, 514; 375/365, 366, 368

[56] References Cited

U.S. PATENT DOCUMENTS

| | | | |
|---|---|---|---|
| 4,748,623 | 5/1988 | Fujimoto | 370/100 |
| 4,920,546 | 4/1990 | Iguchi et al. | 375/106 |
| 4,984,238 | 1/1991 | Watanabe et al. | 370/105.1 |
| 5,132,991 | 7/1992 | McNesby et al. | 375/116 |
| 5,140,618 | 8/1992 | Kinoshita et al. | 375/116 |
| 5,228,036 | 7/1993 | Okamoto et al. | 370/105.1 |
| 5,367,543 | 11/1994 | Uomoto | 375/116 |
| 5,490,147 | 2/1996 | Kubo | 370/105.1 |

*Primary Examiner*—Hassan Kizou
*Assistant Examiner*—Kwang Bin Yao

[57] ABSTRACT

The invention relates to a transmission system for transmitting and detecting the beginning of the frame of a frame synchronized signal, which comprises a first and a second detection circuit (1, 2) and an evaluation circuit (3). The first detection circuit (1) is provided for setting a first detection signal (D1) to a first state upon detection of a first bit sequence located at the beginning of the frame of the signal, and the second detection circuit (2) for setting a second detection signal (D2) to a first state upon detection of a second bit sequence located at a specific frame position of the signal. The evaluation circuit (3) comprises a frame counter (10) which is provided at least during the detection of the beginning of the frame, for resetting the first detection signal (D1) to an initial value after the first state has occurred, and a combining circuit (15) for forming a frame state signal (R) which has a first state only when the first state of the first detection signal (D1) occurs during the initial value, and the first state of the second detection signal (D2) occurs during a specific frame value of the frame counter (10).

8 Claims, 2 Drawing Sheets

TRANSMISSION SYSTEM FOR TRANSMITTING AND DETECTING THE BEGINNING OF THE FRAME OF A FRAME SYNCHRONIZED SIGNAL

BACKGROUND OF THE INVENTION

1. Field of the Invention

The invention relates to a transmission system for transmitting and detecting the beginning of the frame of a frame synchronized signal.

2. Description of the Prior Art

Such a frame synchronized signal may be the 34368 kbit/s signal of the plesiochronous digital hierarchy (PDH) which is capable of transporting different data. The frame of this 34368 kbit/s signal comprises a total of 537 bytes and has a total of 59 columns which have 9 rows each (or bytes) for payload. Additionally, there is a column containing 6 rows (or bytes) of control data. The structure of this frame is diagrammatically shown in FIG. 1. The first 6 rows contain each control data in the first column. Further control data are contained in the first row of the second column. FIG. 2 gives a more detailed representation of the control data. The two bytes FA1 and FA2 (Frame Alignment signal) in the first two columns of the first row are used for detecting the beginning of the frame and have the fixedly defined bit sequence "1111011000101000". The control data MA (Maintenance Adaptation byte) in the first column of the fourth row contain indication bits about the type of the payload to be carried. These indication bits denote the third to fifth bits (referenced Payload Type Identifier {PTI}) of the control field MA. For example, if cells are transported according to the Asynchronous Transfer Mode (ATM), the PTI field contains the bit sequence "010". Further information concerning the frame structure may be obtained from ITU-T Recommendation G.832.

Each ATM cell comprises a header field with a length of 5 bytes and an information field in which payload such as television, picture and sound signals and so on are accommodated, with a length of 48 bytes. In a header field are contained routing identifiers, data for error detection and data for control bits. The frames of the 34368 kbit/s signal of the plesiochronous digital hierarchy accommodate exactly 10 ATM cells. The bytes of the header field are then mapped uncoded and the bytes of the information field of a cell are mapped encoded into the 34368 kbit/s signal.

Examinations have shown that specific bit sequences of the header field of consecutive cells can have the same structure as the bit sequence for the beginning of the frame of the 34368 kbit/s signal. An erroneous beginning of the frame could then be established when the 34368 kbit/s signal is evaluated.

SUMMARY OF THE INVENTION

Therefore, it is an object of the invention to provide a transmission system which makes a reliable detection of the beginning of the frame of the 34368 kbit/s signal of the plesiochronous digital hierarchy possible also when ATM cells are transported.

The object is achieved by a transmission system of the type defined in the opening paragraph which system has the following characteristic features: For transmitting and detecting the beginning of a frame synchronized signal, the transmission system comprises a first detection circuit for setting a first detection signal to a first state upon detection of a first bit sequence located at the beginning of the frame of the signal, a second detection circuit for setting a second detection signal to a first state upon detection of a second bit sequence located at a specific frame position of the signal and an evaluation circuit which includes a frame counter provided for resetting the first detection signal to an initial value at least when the beginning of the frame is detected after the first state, and includes a combining circuit for forming a frame state signal, which signal has a first state only when the first state of the first detection signal occurs during the initial value and the first state of the second detection signal occurs during a specific frame value of the frame counter.

The transmission system according to the invention comprises a first detection circuit which detects the beginning of the frame of a frame synchronized signal, and a second detection circuit which detects a specific frame position of the frame synchronized signal. For example, the first detection circuit determines the bit sequence of the bytes FA1 and FA2 when data are received of the 34368 kbit/s signal of the plesiochronous digital hierarchy, and the second detection circuit determines the 3 bits of the PTI field. If the beginning of the frame and the defined frame position have been detected, a first or second detection signal respectively, changes to a first state. An evaluation circuit establishes whether the beginning of the frame of the frame synchronized signal has been found. For this purpose, the evaluation circuit includes a frame counter which is provided for counting the bit positions of the frame synchronized signal. For example, the frame counter counts 4296 clocks in the 34368 kbit/s signal of the plesiochronous digital hierarchy, before it is reset to its initial value (for example zero). The frame counter can be reset by the first-state first detection signal only when the beginning of the frame has not yet been detected. Furthermore, the evaluation circuit includes a combining circuit which forms a frame state signal. The frame state signal has a first state when the first detection circuit has detected the beginning of the frame and the second detection circuit has detected the defined frame position. The first state of the frame state signal denotes that the beginning of the frame has been found.

An erroneous detection of the beginning of the frame is most probably excluded by the detection of two bit sequences. Experiments with the 34368 kbit/s signal of the plesiochronous digital hierarchy have also produced a safe detection of the beginning of the frame.

In an embodiment of the invention, the first and second detection circuits include each a shift register for entering the bits of the signal available as a serial data stream, and a comparator for comparing the bit sequence buffered in the shift register with the first or second bit sequence, respectively, for setting the first or second detection signal respectively, to the first state when the bit sequence buffered in the shift register corresponds to the first or second bit sequence, respectively, for setting the first or second detection signal respectively, to a second state when the bit sequence buffered in the shift register does not correspond to the first or second bit sequence, respectively.

In order to enhance the probability of finding the correct beginning of the frame, the frame state signal is be in the first state various times in succession (for example twice). Even if there is established that the beginning of the frame in the signal is no longer found, the frame state signal is to be in a second state various times in succession (for example five times). As a remit, brief errors will be ignored.

The evaluation circuit therefore includes a state generating circuit generating a next-state signal, which state generating circuit is provided for changing a next-state signal from a second state to a first state when the frame state signal has the first state several times in succession, and for changing a next-state signal from the first state to the second state when the frame state signal has the second state several times in succession. After the next-state signal has changed to the second state, the frame counter is reset to the initial value when the first state of the first detection signal occurs. Thus, when the next-state signal indicates (first state) that the beginning of the frame has been detected several times in succession, the frame counter can no longer be reset by the first detection signal.

For forming the frame state signal, the combining circuit comprises three flip-flop elements and one AND gate. After the initial value has been reached, the frame counter is intended to produce a first enable pulse for a first flip-flop to buffer the first detection signal, and after the defined frame value has been reached, to produce a second enable pulse for a second flip-flop to buffer the second detection signal. The combining circuit generating the frame state signal comprises an AND gate and a third flip-flop. The AND gate is coupled to the output of the first and second flip-flops and the third flip-flop is provided for buffering the output signal of the AND gate.

These and other aspects of the invention will be apparent from and elucidated with reference to the embodiments described hereinafter.

DESCRIPTION OF THE PREFERRED EMBODIMENT

Figure 1:
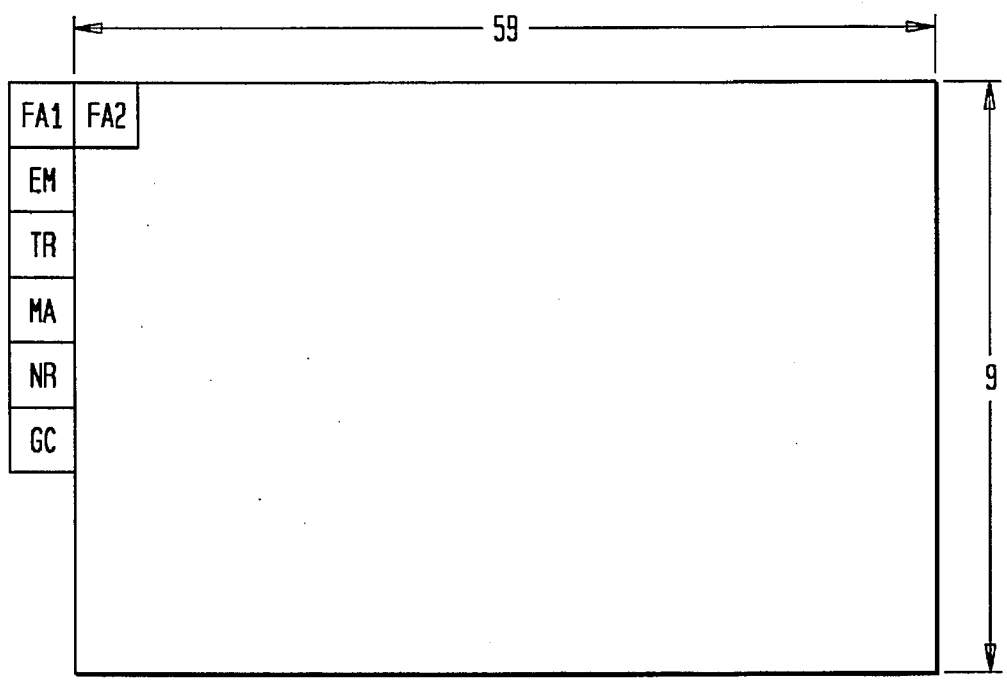
FIG. 1 shows the frame of a 34368 kbit/s signal of the plesiochronous digital hierarchy (PDH)
Figure 2:
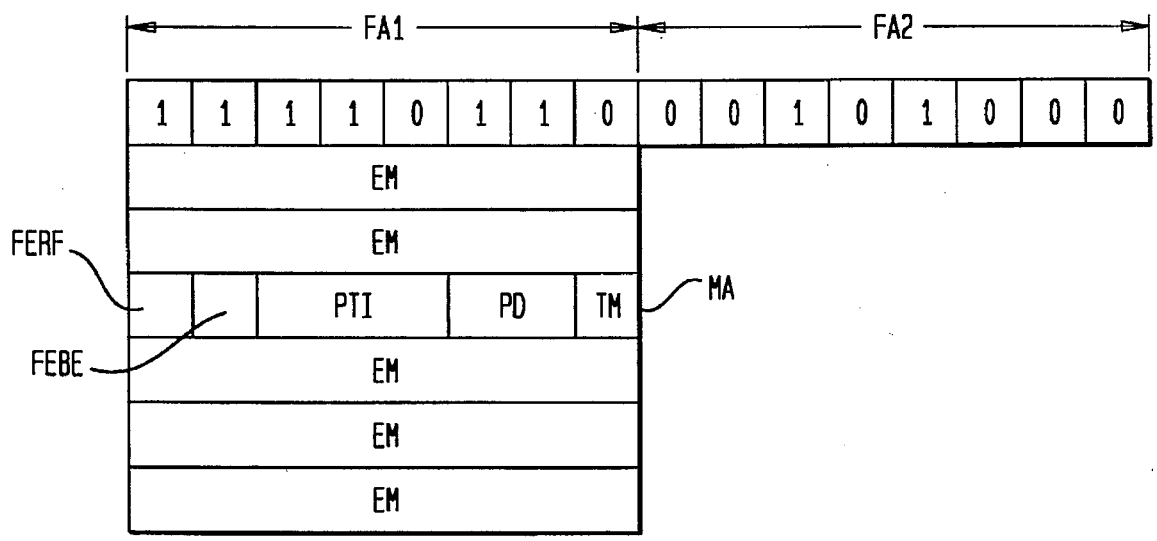
FIG. 2 shows a section of the frame shown in FIG. 1 comprising control data.
Figure 3:
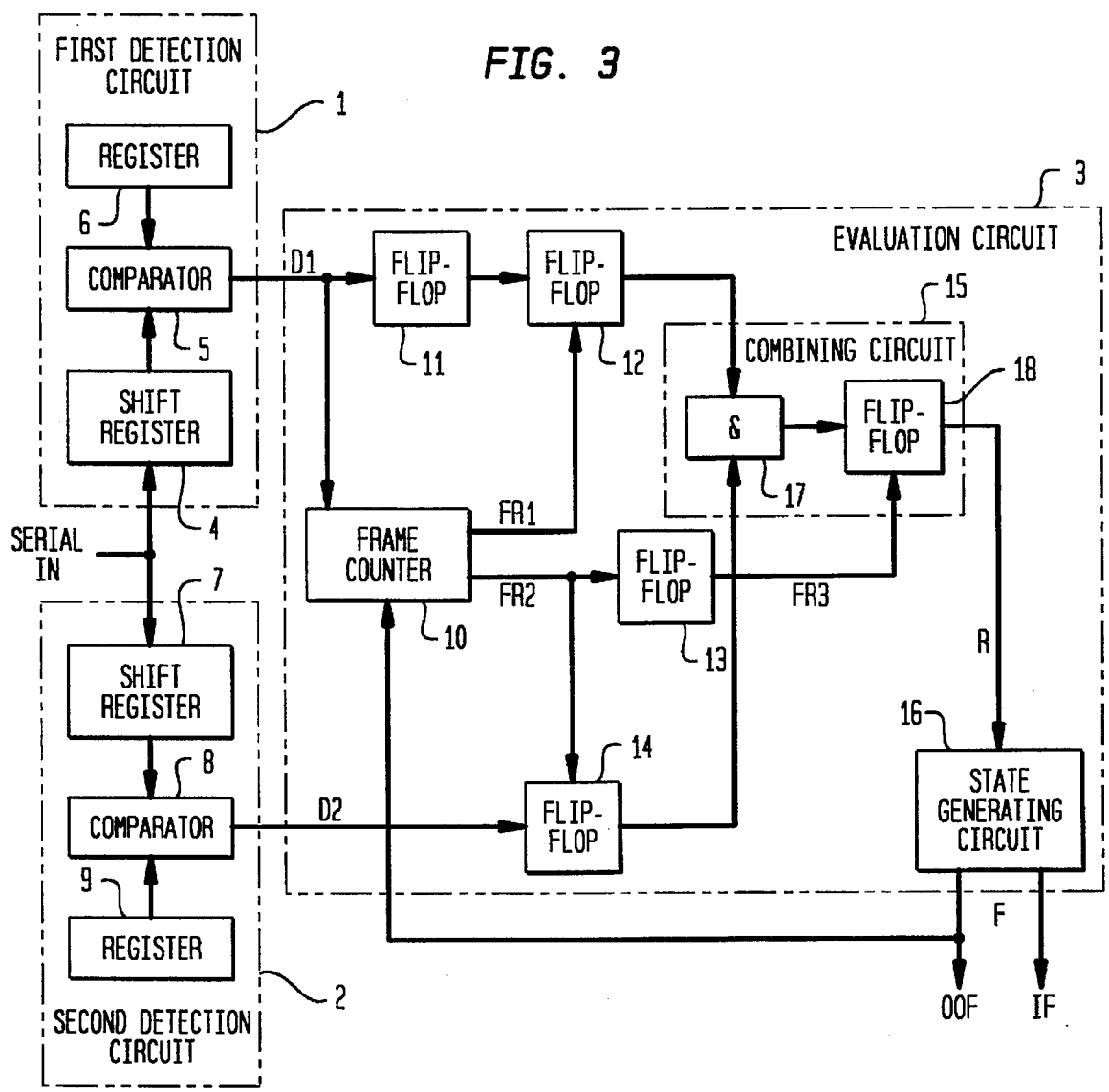
FIG. 3 shows an illustrative embodiment of part of a transmission system comprising a circuit arrangement for detecting the beginning of the frame of the frame synchronized 34368 kbit/s signal of the plesiochronous digital hierarchy.

FIG. 3 shows a circuit arrangement for detecting the beginning of the frame of a 34368 kbit/s signal of the plesiochronous digital hierarchy (PDH) carrying ATM cells, which circuit arrangement forms part of a transmission system for transmitting this plesiochronous signal. For extracting the ATM cells from the plesiochronous signal, the beginning of the frame is to be detected beforehand. The frame of the 34368 kbit/s signal is shown diagrammatically in FIGS. 1 and 2 and has been explained before.

The circuit arrangement shown in FIG. 3 comprises a first detection circuit 1, a second detection circuit 2 and an evaluation circuit 3. Two detection circuits 1 and 2 are supplied with the serial data of the plesiochronous signal. In the first detection circuit 1 the serial data of the plesiochronous signal are written in the shift register 4. The parallel outputs of the shift register 4 are connected to a first input of a comparator 5. The second input of the comparator 5 is coupled to a register 6 which supplies a first bit sequence to the comparator 5. The first bit sequence ("1111011000101000") has a structure corresponding to the control indication bits FA1 and FA2 of the 34368 kbit/s signal. The comparator 5 applies a first detection signal D1 to the evaluation circuit 3. The first detection signal D1 is in a first state if the comparator establishes that the same bit sequences are supplied to its two inputs. In the other cases, thus if the two bit sequences are not the same, the first detection signal is in a second state.

The second detection circuit 2 comprises a second shift register 7, a second comparator 8 and a second register 9 and operates in like manner to the first detection circuit 1. The comparator 8 produces a second detection signal D2. In the register 9 is stored a second 3-bit bit sequence which corresponds to the structure of the PTI (Payload Type Identifier) field ("010") for ATM cells. If the same bit sequences have been stored in the shift register 7 and register 9, the second detection signal D2 adopts a first state and in the other cases adopts a second state.

The evaluation circuit 3 comprises a frame counter 10, four flip-flops 11 to 14, a combining circuit 15 and a state generating circuit 16. The first detection signal D1 is applied to the flip-flop 11 and a reset input of the frame counter 10. The frame counter 10 cyclically counts 4396 clocks of which the number corresponds to the number of bits of a frame of the plesiochronous signal. The initial value of the frame counter 10 is zero. With this value the frame counter 10 applies a first enable pulse FR1 to a further flip-flop 12 (first flip-flop). When the enable pulse occurs, the flip-flop 12 takes over the state of the first detection signal D1 from flip-flop 11.

The frame counter 10 generates a second enable pulse FR2 when the frame counter 10 has reached the count 904. Relative to the zero count at the beginning of the frame, the count 904 corresponds to the third bit of the PTI field. When the enable pulse FR2 is generated, the state of the second detection signal D2 is stored in the flip-flop 14 (second flip-flop). The state of the second enable pulse FR2 is then entered in the flip-flop 13. The flip-flop 13 stores the enable pulse and applies this pulse to the combining circuit 15.

The combining circuit 15 comprises an AND gate 17 and a further flip-flop 18 (third flip-flop). The AND gate 17 combines the output signal of the flip-flop 12 and the output signal of the flip-flop 14. The output state of the AND gate 17 is written in the flip-flop 18 when the enable pulse FR3 of flip-flop 13 occurs. The flip-flop 18 produces a frame state signal R which adopts a second state when the states of the first and second detection signals D1 and D2 stored in the flip-flops 12 and 14 are each in the first state. In the other cases, the frame state signal R is in a second state. The first state of the frame state signal R denotes that the beginning of the frame in the plesiochronous signal has been found.

Figure 4:
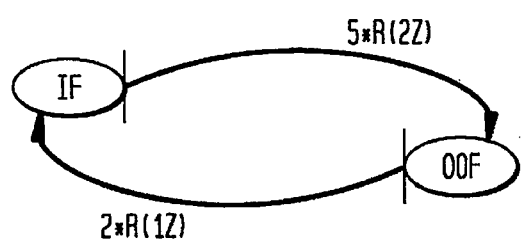
FIG. 4 shows a next-state diagram for explaining a state generating circuit used in FIG. 3.

The state generating circuit 16 receiving the frame state signal R operates in accordance with the next-state diagram shown in FIG. 4. The state generating circuit 16 produces a two-bit next-state signal F whose first bit is denoted OOF (out-of-frame) and whose second bit is denoted IF (in-frame). The next-state signal F is in a first state when the first OOF bit is equal to logic "0" and the second IF bit is equal to logic "1". The next-state signal F is in a second state when the first OOF bit is equal to logic "1" and the second IF bit is equal to logic "0". In FIG. 4 there may be observed the mode of operation of the state generating circuit 16. When the next-state signal F is in a second state, this is referenced state OOF in the next-state diagram. The next-state signal F cannot change from the second to the first state (IF) until the first state of the frame state signal R has occurred two times in succession. The first state of the frame state signal R is referenced R(1Z) in FIG. 4. Conversely, the next-state signal F cannot change until the second state of the frame state signal R has occurred five times in succession. The third state of the frame state signal R is referenced R(2Z) in FIG. 4.

When the next-state signal F is in the second state, the frame counter 10 is not synchronized with the frame of the plesiochronous signal. When the first state of the first detection signal D1 occurs, the frame counter 10 is reset to the initial value. The frame counter 10 changes to the inhibiting mode and cannot be reset until after one cycle (4296 clocks). In the event that after one cycle again the first state of the first detection signal D1 is available, the frame counter 10 which is no longer in the inhibiting mode is reset and inhibited for one cycle. In the event that after one cycle the first state of the first detection signal D1 is not available, the frame counter continuous counting, is not reset and does not change to the inhibiting mode. A renewed occurrence of the first state of the first detection signal D1 causes the frame counter 10 to be reset to the initial value during the cycle. The depicted patterns for synchronizing the frame counter, however, can only take place when the next-state signal is in the second state (first OOF bit equal to logic "1"). The frame counter is thus enabled to be synchronized in that the first OOF bit of the next-state signal is applied to the frame counter 10. If the next-state signal F is in the first state, the frame counter 10 can no longer be reset by the first detection signal.

We claim:

1. System for detecting the beginning of the frame of a frame synchronized signal, comprising a first detection circuit (1) for setting a first detection signal (D1) to a first state upon detection of a first bit sequence located at the beginning of the frame of the signal, a second detection circuit (2) for setting a second detection signal (D2) to a first state upon detection of a second bit sequence located at a specific frame position of the signal and an evaluation circuit (3) which includes a frame counter (10) for keeping track of a current frame position, the frame counter being reset by the first detection signal (D1) to an initial value, and includes a combining circuit (15) for forming a frame state signal (R), which signal has a first state only when the first state of the first detection signal (D1) occurs during the initial value and the first state of the second detection signal (D2) occurs during a specific frame value of the frame counter (10).

2. System as claimed in claim 1, characterized in that the first and second detection circuits (1, 2) include each a shift register (4, 7) for entering the bits of the frame synchronized signal available as a serial data stream, and a comparator (5, 8)

for comparing the bit sequence buffered in the shift register (4, 7) with the first or second bit sequence, respectively, for setting the first or second detection signal (D1, D2) respectively, to the first state when the bit sequence buffered in the shift register (4, 7) corresponds to the first or second bit sequence, respectively, for setting the first or second detection signal (D1, D2) respectively, to a second state when the bit sequence buffered in the shift register (4, 7) does not correspond to the first or second bit sequence, respectively.

3. System as claimed in claim 2, characterized in that the evaluation circuit (3) includes a state generating circuit (16) generating a next-state signal (F), which state generating circuit is provided for changing a next-state signal (F) from a second state to a first state when the frame state signal (R) has the first state several times in succession, and for changing a next-state signal (F) from the first state to the second state when the frame state signal (R) has a second state several times in succession, and in that the frame counter (10) is reset to the initial value when the first state of the first detection signal occurs after the next-state signal (F) has changed to the second state.

4. System as claimed in claim 2, characterized in that the frame counter (10) is intended to produce a first enable pulse (FR1) for a first flip-flop (12) to buffer the first detection signal (D1) after the initial value has been reached by cyclically counting, and after the defined frame value has been reached, to produce a second enable pulse (FR2) for a second flip-flop (14) to buffer the second detection signal (D2), in that the combining circuit (15) generating the frame state signal (R) comprises an AND gate (17) and a third flip-flop (18) and in that the AND gate (17) is coupled to the output of the first and second flip-flops (12, 14) and the third flip-flop (18) is provided for buffering the output signal of the AND gate (17).

5. System as claimed in claim 1, characterized in that the evaluation circuit (3) includes a state generating circuit (16) generating a next-state signal (F), which state generating circuit is provided for changing a next-state signal (F) from a second state to a first state when the frame state signal (R) has the first state several times in succession, and for changing a next-state signal (F) from the first state to the second state when the frame state signal (R), has a second state several times in succession, and in that the frame counter (10) is reset to the initial value when the first state of the first detection signal occurs after the next-state signal (F) has changed to the second state.

6. System as claimed in claim 5, characterized in that the frame counter (10) is intended to produce a first enable pulse (FR1) for a first flip-flop (12) to buffer the first detection signal (D1) after the initial value has been reached by cyclically counting, and after the defined frame value has been reached, to produce a second enable pulse (FR2) for a second flip-flop (14) to buffer the second detection signal (D2), in that the combining circuit (15) generating the frame state signal (R) comprises an AND gate (17) and a third flip-flop (18) and in that the AND gate (17) is coupled to the output of the first and second flip-flops (12, 14) and the third flip-flop (18) is provided for buffering the output signal of the AND gate (17).

7. System as claimed in claim 1, characterized in that the frame counter (10) is intended to produce a first enable pulse (FR1) for a first flip-flop (12) to buffer the first detection signal (D1) after the initial value has been reached by cyclically counting, and after the specific frame value has been reached, to produce a second enable pulse (FR2) for a second flip-flop (14) to buffer the second detection signal (D2), in that the combining circuit (15) generating the frame state signal (R) comprises an AND gate (17) and a third flip-flop (18) and in that the AND gate (17) is coupled to the output of the first and second flip-flops (12, 14) and the third flip-flop (18) is provided for buffering the output signal of the AND gate (17).

8. System for detecting the beginning of a frame in a frame synchronized signal, the system comprising a first detection circuit for supplying a first detection signal, such that said first detection signal has a detection state upon detection of a first bit sequence, which first bit sequence is expected at an initial position of the frame;

a second detection circuit for supplying a second detection signal, such that said second detection signal has a detection state upon detection of a second bit sequence, which second bit sequence is expected at a fixed second position of the frame which second position has known distance from the initial position;

an evaluation circuit including a frame counter for keeping track of a current frame position, the frame counter being reset by the first detection signal to an initial state;

a combining circuit for forming a frame state signal, such that the frame state signal has a detection state only when the detection state of the first detection signal occurs at the initial position; and the detection state of the second detection signal occurs at the second position.

* * * * *